(12) United States Patent
Liu et al.

(10) Patent No.: US 11,991,254 B1
(45) Date of Patent: May 21, 2024

(54) ONTOLOGY-BASED APPROACH FOR MODELING SERVICE DEPENDENCIES IN A PROVIDER NETWORK

(71) Applicant: Amazon Technologies, Inc., Seattle, WA (US)

(72) Inventors: James Liu, Kirkland, WA (US); Eric Seeb, Lake Forest Park, WA (US); Michael Foley, Alexandria, VA (US); Manoranjan Mishra, Aldie, VA (US); Tausif Usman Akhtar, Burke, VA (US); Gabriel Debize Mendes De Moraes, Alexandria, VA (US); Veera Nunna, Herndon, VA (US); Mark Tolerico, Gainesville, VA (US); Christopher T Willis, Aldie, VA (US)

(73) Assignee: Amazon Technologies, Inc., Seattle, WA (US)

( * ) Notice: Subject to any disclaimer, the term of this patent is extended or adjusted under 35 U.S.C. 154(b) by 19 days.

(21) Appl. No.: 17/850,140

(22) Filed: Jun. 27, 2022

(51) Int. Cl.
| | |
|---|---|
| *H04L 67/51* | (2022.01) |
| *G06F 16/36* | (2019.01) |
| *G06F 40/30* | (2020.01) |
| *G06N 5/022* | (2023.01) |
| *G06Q 30/04* | (2012.01) |

(52) U.S. Cl.
CPC ............ *H04L 67/51* (2022.05); *G06F 16/367* (2019.01); *G06F 40/30* (2020.01); *G06N 5/022* (2013.01); *G06Q 30/04* (2013.01)

(58) Field of Classification Search
CPC ....... H04L 67/51; G06F 16/367; G06F 40/30; G06N 5/022; G06Q 30/04
USPC .......................................................... 709/224
See application file for complete search history.

(56) References Cited

U.S. PATENT DOCUMENTS

| | | | | |
|---|---|---|---|---|
| 2005/0289134 | A1* | 12/2005 | Noguchi | G06F 16/367 |
| 2019/0138288 | A1* | 5/2019 | Brealey | G06F 11/3688 |
| 2021/0042635 | A1* | 2/2021 | Li | G06F 16/367 |
| 2022/0101153 | A1* | 3/2022 | Hubauer | G06N 20/00 |

* cited by examiner

*Primary Examiner* — Wing F Chan
*Assistant Examiner* — Leon Y Tseng
(74) *Attorney, Agent, or Firm* — NICHOLSON DE VOS WEBSTER & ELLIOTT LLP

(57) ABSTRACT

Techniques for an ontology-based approach for modeling service dependencies in a provider network. The approach is flexible and extensible to different provider network SOA systems and not limited to a particular provider network or a particular SOA system. The approach can be used to model an entire SOA system or selected portion thereof and from different perspectives. In some examples, the approach uses an ontology represented using a Web Ontology Language (OWL). In some examples, the ontology is used to identify service dependencies and relationships in a knowledge base that is populated based on operational data collected in the provider network environment.

17 Claims, 8 Drawing Sheets

| INQUIRIES | ONTOLOGY CLASS | ONTOLOGY RELATIONSHIP |
|---|---|---|
| Q1 – WHAT SERVICES ARE DEPLOYED IN A REGION? | SERVICE<br>HOST FLEET<br>REGION | DEPLOYED IN<br>DEPLOYED ON |
| Q2 – WHAT SERVICES INCUR BILLING USAGE BY AN ACCOUNT? | SERVICE<br>ACCOUNT | BILLED USAGE OF |
| Q3 – WHAT ACCOUNT DOES A PIPELINE DEPLOY TO? | PIPELINE<br>PIPELINE STAGE<br>ACCOUNT | HAS<br>DEPLOYS TO |
| Q4 – WHAT FEATURES ARE IMPLEMENTED BY A SERVICE? | SERVICE<br>FEATURE | IMPLEMENTS |
| Q5 – WHAT OTHER SERVICES DOES A SERVICE DEPEND ON? | SERVICE | DEPENDS ON |
| Q6 – WHAT OTHER SERVICES DOES A SERVICE INTERACT WITH? | SERVICE | INTERACTS WITH |
| Q7 – WHICH SERVICES ARE ALIKE? | SERVICE<br>FEATURE<br>PROTOCOL<br>PROGRAMMING LANGUAGE | USES<br>IMPLEMENTS<br>PROGRAMMED IN |

*FIG. 3*

ONTOLOGY-BASED APPROACH FOR MODELING SERVICE DEPENDENCIES IN A PROVIDER NETWORK

BACKGROUND

The first web services were largely multi-tiered, monolithic client-server applications with no dependencies on other server applications or web services. Responding to client requests was mainly accomplished by processing the requests through web, application, and database server tiers logically arranged in a stack architecture. Over time, web services began to communicate with other web services for a handful of specialized purposes such as, for example, authentication, authorization, auditing, online shopping cart, or online payment purposes. In both cases, tracking dependencies between web services was relatively simple because the dependencies were relatively few.

With the ever-increasing popularity and prevalence of the Internet, particularly in the "cloud" provider network portion of the Internet, however, more and more web services communicate with and rely on other web services to provide overall application functionality to users. A cloud provider network, or just "provider network," provides a user with the ability to use a compute resource or to accomplish a computing task without the user having to provision the underlying compute, storage, and networking resources themselves. Instead, the service provider of the provider network manages this provisioning for the user, typically for a service charge, usage fee, or subscription fee billed to the user (sometimes referred to as a "customer" of the provider network.) With this cloud computing model, the user able to focus more on the domain-specific aspects of their particular computing needs without worrying as much about how those needs are supported in terms of the fundamental computing, storage, and networking resources.

A user of a provider network can use a user account to interact with the provider network across an intermediate network (e.g., the Internet). The interaction can occur via an Application Programming Interface (API). Generally speaking, an API refers to a predefined interface or communication protocol between computing devices such that if the one of the computing devices makes a request of the other computing device in the predefined format, the requesting computing device (sometimes referred to as the "client" computing device) should receive a response from the responding computing device (sometimes referred to as the "server" computing device) in the predefined format or initiate a predefined action. Many web services use the Hypertext Transfer Protocol (HTTP) or its secure variant thereof (HTTPS) as the application layer networking protocol for communicating between devices according to an API.

In the provider network context, an API also provides a gateway for a user to access provider network infrastructure by allowing the user to store data in, obtain data from, or cause actions within the provider network thereby enabling, for example, the development of a web or mobile application that interacts with resources and services hosted in the provider network. An API can also enable different services of the provider network to exchange data with one another. In this case, an API can be part of, or serve as a front-end to, a control plane of the provider network that includes "back-end" services supporting and enabling the services that are more directly offered to customers.

As more and more web services are hosted by provider networks, either as provider network "platform" services (e.g., computing, storage, networking, database, analytics, application, deployment, management, or machine learning services) that the service provider of the provider network offers to users of the provider network and to other platform services, or as "user" services (e.g., user websites or mobile applications) that users deploy in the provider network and that leverage or use platform services or other user services, a whole new set of challenges face provider network service providers and users alike: web services that were previously implemented as largely self-contained, monolithic systems are now implemented as interdependent service-oriented systems. Specific challenges, for example, include the following: (1) identifying the services that exist in the provider network or a particular region of the provider network, (2) determining the dependencies that services have on each other, (3) identifying existing reusable services in the provider network or a particular region of the provider network that can be used as-is or extended to compose new services, and (4) determining the development team or teams responsible for coding or maintaining a particular service.

BRIEF DESCRIPTION OF DRAWINGS

Various examples in accordance with the present disclosure will be described with reference to the drawings, in which:

FIG. 3 is a table of some possible inquiries about a service-oriented architecture system modeled according to the ontology excerpt of FIG. 1, according to some examples.

DETAILED DESCRIPTION

Figure 1:
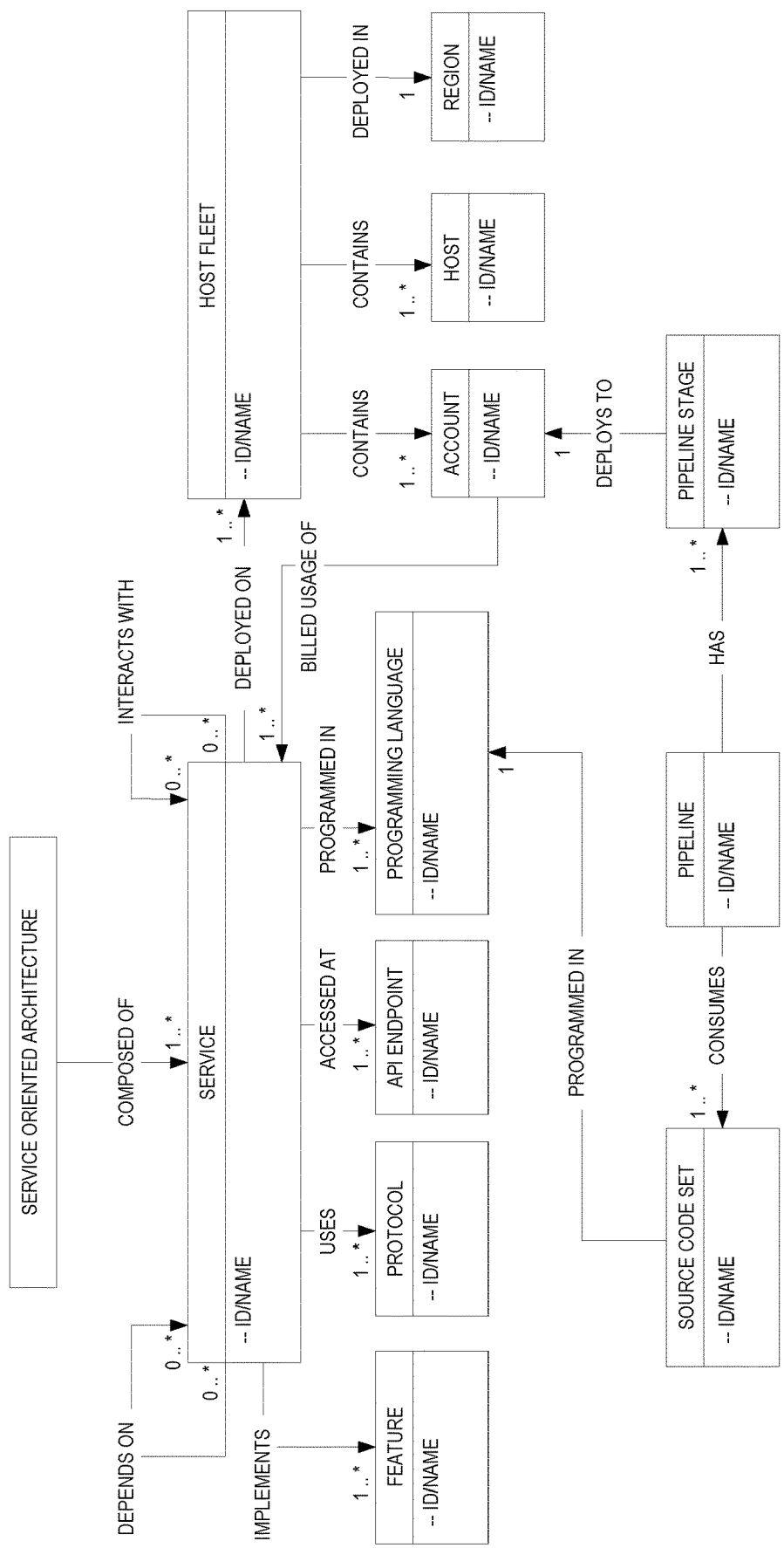
FIG. 1 illustrates an example excerpt of an ontology for modeling a service-oriented architecture composed of services in a provider network, according to some examples.

Techniques for an ontology-based approach to modeling service dependencies in a provider network and applications thereof are provided.

Overview

Service-Oriented Architecture (SOA) is a computing system architectural style that has gained in popularity in recent years in the provider network industry. SOA handles complexity by decomposing large computing systems into sets of more modular and reusable services. With SOA, a given end-user web or mobile application that is hosted by a provider network is implemented as set of services in the provider network composed to meet requirements of the particular application at hand.

A benefit of SOA to application developers is that it promotes reuse. However, developers need to be able to identify existing reusable services in the provider network that could be used as-is or extended to compose new services. Similarly, the service provider may wish to identify dependencies that a service has on other services. For example, a particular service that depends on a set of other services may be deployed in a first region of the provider network (e.g., a data center facility on the West coast of the United States). The service provider may now wish to provision the particular service in a second region of the provider network (e.g., a data center facility on the East coast of the United States). Before doing so, the service provider would like to ensure that the set of other services already exist in the second region. If not, the service provider can provision the other services and any of their service dependencies in the second region before provisioning the particular service in the second region. Complicating the service dependency modeling task can be operational and organizational aspects. Different services can be developed and operated by different developer and operations teams, programmed in different software programming languages, or use different platform services.

Techniques disclosed herein address these and other issues with an ontology-based approach to modeling service dependencies in a provider network. The approach supports modelling SOA systems such as many provider network systems. The approach is flexible and extensible to different provider network SOA systems and not limited to a particular provider network or a particular SOA system. The approach can be used to model an entire SOA system or selected portion thereof and from different perspectives. In some examples, the approach uses an ontology represented using a Web Ontology Language (OWL). In some examples, the ontology is used to identify service dependencies and relationships in a knowledge base.

Service-Oriented Architecture

In some examples, the techniques are used to model a service-oriented architecture (SOA) in a provider network. With SOA, services are relatively autonomous, yet work together, but nonetheless are configured or programmed to do one or few things well. Generally speaking, a SOA service, or just "service," can be discrete unit of functionality that can be accessed remotely and acted upon and updated independently. SOA can be independent of vendors, products, and technologies. A service can logically represent a repeatable function or set of functions with a specified outcome or set of outcomes. A service can be self-contained. A service can be a black box for its users where the inner working of the service may be opaque the users. A service can be composed of other services. Different services can be used together in a mesh of services to provide overall application functionality. SOA can integrate, distributed, separately maintained and deployed services. SOA can enable technologies and standards that facilitate communication and cooperation between services over a data communications network such as, for example, an Internet Protocol (IP) network.

However, the complexity of SOA presents challenges to service providers responsible for architecting and maintaining services in the provider network. For example, the sheer number of services developed and supported by different developer-operations teams that are continually deploying new services and new updates to their services in the provider network can create a situation where it may not be known which services are deployed and which services depend on or interact with which other services, or, at best, this knowledge is distributed informally across developer-operations teams in an uncoordinated, decentralized manner Ontology-Based Modeling In some examples, the techniques use an ontology or an explicit specification of a conceptualization of the SOA of the provider network. The ontology can be used to represent and codify the SOA including the services that make up the SOA. The ontology can be descriptive and normative. In particular, the ontology can formalize the SOA into a knowledge structure through a generic description of relevant concepts, properties, and relationships. The ontology can encompass a vocabulary of related terms and their significance which facilitates knowledge sharing across different developer-operations (dev-ops) teams of the service provider.

In some examples, the ontology encompasses a knowledge representation that can be based on named graphs. A graph can be a data model for objects and their relationships. In a graph, objects are represented as nodes in the graph and relationships are represented as edges between the nodes. In addition, knowledge can be organized through subject-predicate-object statements which are also referred to herein as "triples." The ontology facilitates high expressiveness and reasoning capabilities compared to other knowledge data structures such as relational databases.

Use of the ontology facilitates machine understanding of the SOA by both humans and machines. Use of the ontology provides various benefits. One benefit is the formal specification of the semantics of the SOA. Another benefit is the ability to reason on the content of the conceptual model of the SOA as represented by the ontology. Yet another benefit is that the ontology improves domain-specific knowledge reuse and enhances the domain's structural and behavioral description Modeling the SOA of the provider network using the ontology can overcome some deficiencies of other approaches such as informal documentation. In particular, the ontology provides a uniform way to model autonomous and heterogeneous services at a level of abstraction that facilitates efficient interconnection through dynamic relation. The ontology also facilitates analyzing and exploring the SOA from multiple viewpoints and modeling at different granularity levels. In particular, each different viewpoint can be instantiated as a separate model and analyzed and explored separately of other models instantiated under the ontology for other viewpoints.

Example Ontology Excerpt

The ontology can be focused on SOA in provider networks. In some examples, the ontology is instantiated and formalized in a Web Ontology Language such as, for example, OWL2 DL. OWL is a Web Ontology Language designed for use by applications that need to process the content of information instead of just presenting information. OWL facilitates machine interpretability of content by providing an additional vocabulary along with formal semantics. OWL encompasses three increasingly expressive sublanguages: OWL Lite, OWL DL, and OWL Full. More information on OWL is available on the Internet at /TR/owl-features/ in the w3.org domain.

FIG. 1 illustrates a Uniform Modeling Language (UML) view of an example excerpt of a possible ontology of a SOA of a provider network, according to some examples. The example excerpt contains a set of classes of the ontology and relationships between classes. As illustrated, a service-oriented architecture is composed of one or more services. A service can interact with zero or more other services or depend on zero or more other services. A service can be deployed on a host fleet that contains one or more hosts. A fleet can be deployed in a region of the provider network. A fleet can also contain one or more accounts. A service implements one or more features, uses one or more protocols, can be accessed at one or more API endpoints, and can be programmed in one or more programming languages. A source code set can be programmed in a programming language and can be consumed by a pipeline which has one or more pipeline stages. A pipeline stage can be deployed to an account.

In the example ontology excerpt, a service can represents a set of one or more computing processes or tasks that communicate over a data communications network (e.g., an IP network) to fulfill a goal using a set one or more communications protocols (e.g., HTTP or HTTPS). A service can be organized around business or technological capabilities. A service can be programmed in using one or more software programming languages (e.g., JAVA, PYTHON, C/C++, etc.) according to the requirements of the particular service at hand. A service can be relatively small in size, messaging enabled, bounded by contexts, autonomously developed, independently deployable, decentralized and build and released using automated processes.

A protocol can be a system of rules that allows two or more services to transmit information with each other. A protocol can define the rules, syntax, semantics, and synchronization of communication and possible error recovery methods. Examples of possible protocols include application layer protocols such as HTTP, HTTPS, DNS, IMAP, LDAP, etc.

An API endpoint can be a Uniform Resource Indicator (URI) or the like at which an API of a service can be accessed at using a protocol. An API endpoint can be viewed as a Uniform Resource Locator (URL) of an entry point for a service. In some examples, an API endpoint is a regional endpoint for accessing a service in a particular region of the provider network. For example, a service can have a regional API endpoint for a region of the provider network located in a US East (Ohio) region of the provider network and another regional API endpoint for a different region of the provider network located in a US West (N. California) region of the provider network. For example, the API endpoint for the service in the US East (Ohio) region might be https://someservice.us-east-2.example.com and the API endpoint for the service in the US West (N. California) region of the provider network might be https://someservice.us-west-1.example.com.

A programming language can be a software programming language in which a service is programmed Example possible programming languages include PYTHON, JAVASCRIPT, JAVA, C #, C, C++, GO, R, SWIFT, PHP, etc.

A service can be deployed on a host fleet in a region of the provider network. A service can be deployed on multiple host fleets in the same region or on multiple host fleets in different regions. A host fleet contains one or more hosts. A host can be a virtual host such as a virtual machine instance or a container. A host can be a physical computing device such as a physical service computing device. A host can be a dedicated host that is dedicated to one user of the provider network, or a multi-tenant host that is shared by users. Likewise, a host fleet that contains only dedicated hosts is a dedicated fleet, a host fleet that contains only multi-tenant hosts is a multi-tenant fleet, and a host fleet that contains a mix of dedicated and multi-tenant hosts is a mixed fleet. A host fleet and the host(s) it contains can be deployed in a region of the provider network. A region can correspond to a geographic region where the service provider has clustered one or more data center or physical compute hosting facilities with redundant power, networking, and connectivity. In some examples, a region is divided into zones (sometimes referred to as "availability zones") where each availability zone within a region corresponds to one or more discrete data centers with redundant power, networking, and connectivity.

As part of the provider network, the service provider may operate a fully managed continuous code delivery service encompassing pipelines. A pipeline represents a workflow construct that describes how changes to a software source code set consumed by the pipeline go through a code release process. A pipeline can encompass a workflow as a sequence of pipeline stages and actions. A source code set can undergo a revision which is a change to the source code set such as a change to source code, build output, configuration, or data. A pipeline can have multiple revisions to a source code set flowing through it at the same time. A pipeline stage can be a group of one or more actions. A pipeline can have two or more stages. An action can be a task performed on a revision of a source code set. When an action is executed, the action acts on a file or a set of files such as, for example, a set of source code files. These files are sometimes referred to as artifacts. An artifact can be operated upon by a later action in the pipeline. For example, a source code action might output the latest version of a source code set as a source artifact that a later build action will use as input. Following the compilation, the build action might upload the build output as another artifact, which might be read by a later deployment action that deploys an executable artifact to one or more hosts of a host fleet in the context of an account.

A user account can incur billing usage of a service such as a platform service in the provider network. The account's usage of the service can be metered by the provider network service provider and the account billed accordingly. For example, an account might be billed in terms of network bandwidth consumed, network requests processed, CPU time used, or storage capacity consumed by the account.

Knowledge Base

FIG. 1 illustrates an example excerpt of an ontology for modelling a service-oriented architecture in a provider network, expressed in UML. Once an SOA ontology has been created or formalized in a Web Ontology Language such as, for example, OWL2 DL, then the ontology can be used to create a knowledge base. The knowledge base can contain the ontology including its Web Ontology Language definition in addition to a set of triples that conform to the ontology. In particular, a triple in the knowledge base can be an atomic data entity that codifies a statement about the provider network modeled by the ontology in the form a subject-predicate-object expression. In some examples, a triple conforms to the Resource Description Framework (RDF) model and syntax specification. More information on RDF can be found on the Internet at /TR/PR-rdf-syntax/ in the w3.org domain, the entire contents of which is hereby incorporated by reference.

A triple enables knowledge about the provider network to be represented in a machine-readable way. In some examples, each part of the triple can be individually addressed in the knowledge base via a unique Uniform Resource Indicator (URI). For example, the statement "Service ABC is deployed on Host Fleet 1234" might be represented in RDF as:

Subject→https://example.org/service/ABC
Predicate→https://example.org/relation/deployed_on
Object→https://example.org/host_fleet/1234

Figure 2:
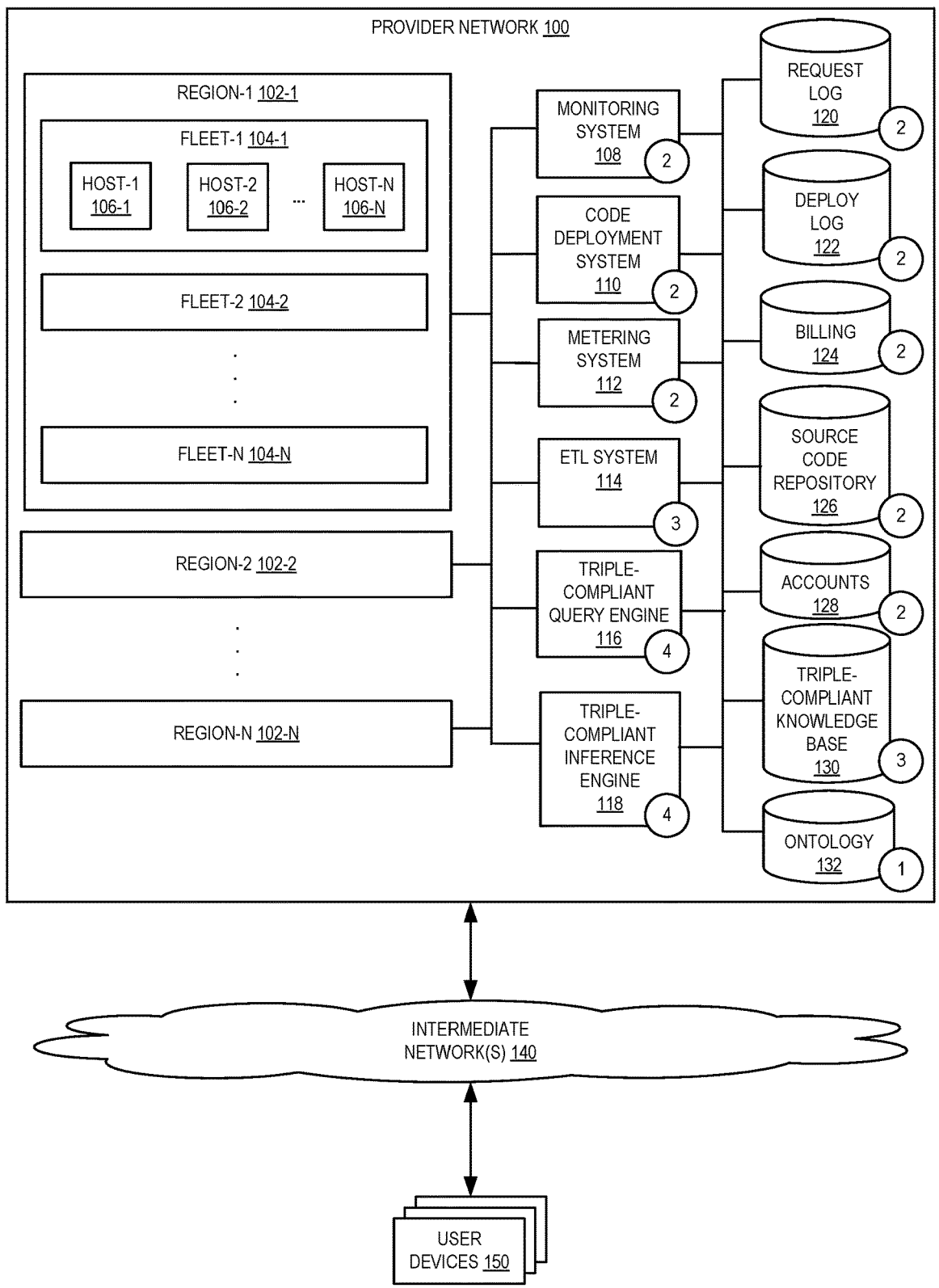
FIG. 2 illustrates an example provider network environment in which techniques for an ontology-based approach for modeling service dependencies in a provider network can be implemented, according to some examples.

In some examples, a set of triples is created in a knowledge base based on operational data collected from a provider network environment. FIG. 2 illustrates an example provider network environment in which techniques for the ontology-based approach for modeling service dependencies in a provider network can be implemented. The environment includes provider network 100 which is communicatively coupled to a set of user device 150 via a set of one or more intermediate networks 140. Provider network 100 includes a set of one or more regions 102-1, 102-, . . . 102-N. Within each region 102 are a set of one or more host fleets (e.g., 104-1, 104-2, and 104-N). Each host fleet contains a set of one or more hosts (e.g., 106-1, 106-2, . . . 106-N).

Provider network 100 can be programmed or configured to adhere to a "cloud" computing model that enables ubiquitous, convenient, on-demand network access to a shared pool of configurable resources such as networks, servers, storage applications, and services. The resources can be rapidly provisioned and released with minimal management effort or service provider interaction. A user of provider network 100 can unilaterally provision computing capabilities in provider network 100, such as server time and network storage, as needed automatically without requiring human interaction with each service provider.

Capabilities of provider network 100 can be available over set of one or more intermediate networks 140 and accessed through standard mechanisms that promote use by heterogeneous thin or thick client platforms such as mobile phones, tablets, laptops, and workstations. Computing resources such as storage, processing, memory, and network bandwidth in provider network 100 can be pooled to serve multiple users using a multi-tenant model, with different physical and virtual resources dynamically assigned and reassigned according to user demand There can be a sense of location independence in that the user generally can have no control or knowledge over the exact location of provided resources but can be able to specify location at a higher level of abstraction such as, for example, at the level of a country, state, or datacenter.

Provider network 100 can automatically control and optimize resource use by leverage a metering capability (e.g., on a pay-per-use or on a charge-per-use basis) at a level of abstraction appropriate to the type of service such as storage, processing, bandwidth, and active user accounts. Resource usage in provider network 100 can be monitored, controlled, and reported, providing transparency for both the provider and the user of a utilized service.

Provider network 100 can provide its capabilities to users according to a variety of different service models including Software-as-a-Service ("SaaS"), Platform-as-a-Service ("PaaS"), and Infrastructure-as-a-Service ("IaaS").

With SaaS, a capability can be provided to a user using the provider's software applications running on the infrastructure of provider network 100. The applications can be accessible from various client devices through either a thin client interface such as a web browser, or an API. The infrastructure can include the hardware resources such as server, storage, and network components and software deployed on the hardware infrastructure that are necessary to support the services being provided. Typically, under the SaaS model, the user does not manage or control the underlying infrastructure including network, servers, operating systems, storage, or individual application capabilities, except for limited user-specific application configuration settings.

With PaaS, the user can be provided the capability to deploy onto hardware and software infrastructure of provider network 100 user-created or acquired applications using programming languages, libraries, services, and tools supported by the provider or other sources. Typically, under the PaaS model, the user does not manage or control the underlying hardware and software infrastructure including network, servers, operating systems, or storage, but can have control over the deployed applications and possibly configuration settings for the application-hosting environment.

With IaaS, the user can be provided the capability to provision processing, storage, networks, and other fundamental computing resources where the user can deploy and run arbitrary software, which can include operating systems and applications. The user typically does not manage or control the underlying hardware and software infrastructure but can have control over operating systems, storage, and deployed applications and possibly limited control of selecting network components such as, for example, host firewalls.

Provider network 100 can provide its capabilities to a user according to a variety of different deployment models including as a private cloud, as a community cloud, as a public cloud, or as a hybrid cloud.

In a private cloud, the hardware and software infrastructure of provider network 100 can be provisioned for exclusive use by a single organization which can comprise multiple users (e.g., business units). The private cloud can be owned, managed, and operated by the organization, a third party, or some combination of them, and it can exist on or off premises.

In a community cloud, the hardware and software infrastructure of provider network 100 can be provisioned for exclusive use by a specific community of users from organizations that have shared concerns such as mission security requirements, policy, and compliance considerations. The community cloud can be owned, managed, and operated by one or more of the organizations in the community, a third party, or some combination of them, and it can exist on or off premises.

In a public cloud, the infrastructure can be provisioned for open use by the public. The public cloud can be owned, managed, and operated by a business, academic, or government organization, or some combination of them. A public cloud can exist on the premises of the public cloud provider.

In a hybrid cloud, the infrastructure can be a composition of two or more distinct cloud infrastructures (private, community, or public) that remain unique entities, but that can be bound together by standardized or proprietary technology that enables data and application portability such as, for example, cloud bursting for load balancing between clouds.

To provide resource services to user, provider network 100 can rely upon virtualization techniques. For example, virtualization technologies can provide users the ability to control or use compute resources (e.g., a "compute instance," such as a virtual machine (VM) using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by provider network 100 to perform a variety of computing tasks. Additionally, or alternatively, a user can indirectly use a compute resource by submitting code to be executed by provider network 100, which in turn can use one or more compute resources to execute the code—typically without the user having any control of or knowledge of the underlying compute instance(s) involved.

A user of provider network 100 can use a user account that is associated with a customer account, though these terms can be used somewhat interchangeably depending upon the context of use. A user can interact with provider network 100 across set of intermediate networks 140 (e.g., the Internet, a cellular network, etc.) via an interface, such as through use of an application programming interface (API) call, via a console implemented as a website or web application, etc.

An API can refer to an interface or communication protocol between a client and a server, such that if the client makes a request in a predefined format, the client can receive a response in a specific format or initiate a defined action. In context of provider network 100, an API can provide a gateway for a customer to access cloud infrastructure by allowing the customer to obtain data from or cause an action within provider network 100, enabling the development of an application that interacts with a resource or a service hosted in the provider network 100. An API can also enable a service of provider network 100 to exchange data with another service of provider network 100.

Various systems in provider network can collect operational data from hosts, host fleets, and regions in provider network 100. Monitoring system 108 can record in request log 120 a record of activity in accounts. An activity can be an action taken in provider network 100 by a user, role, or service that is monitored by monitoring system 108. The record of the activity in request log 120 can be in the form of events which can provide a history of both API and non-API account activity in provider network 100. The events can include management events and data events recorded in request log 120 by monitoring system 108.

A management event can reflect an operation that is perform on a resource in an account. For example, the operation can be a control plane operation such as configuring security, registering a device, configuring a rule for routing data, or setting up a logging operation. A management event can also include non-API events that occur in an account. For example, if a user signs into an account, a login event may be recorded in request log 120.

A data event can reflect a resource operation performed in provider network 100 on or in a resource. For example, a resource operation can be a data plane operation. Data events can be high-volume activities. For example, a data event can be any of: an object data storage service object-level API activity such as getting an object, deleting an object, or putting an object with respect to a bucket (a named collection of data objects); an on-demand code execution service activity such as invoking the serverless execution of code; an key-value data storage service object-level API activity such as putting an item, deleting an item, or updating an item; a managed blockchain service activity such as a JSON-RPC call on an ETHEREUM node such as a get balance or get block by number operation; a database service activity API activity on a database table, etc.

Code deployment system 110 can record in deployment log 122 the operation of code deployment pipelines and pipeline stages. Deployment log 122 can record various pipeline deployment events such as which versions of which source code sets stored in source code repository 126 are deployed by which pipelines and pipeline stages to which accounts and which host fleets. Code deployment system 110 can encompass a continuous delivery service that enables a user to model, visualize, and automate the steps required to release software code sets stored in source code repository 126 to accounts and host fleets in provider network. Code deployment system 110 can be configured to build, test, and deploy software code sets according to workflows defined as pipelines whenever there are changes to source code sets.

Metering system 112 can record account usage of billable compute and networking resources of provider network 100. Metering system 112 can record such usage in billing database 124. Metering can be in various forms including in terms of time, capacity, speed, storage and can vary from service to service. For example, an elastic computing service might bill an account based on virtual machine instance uptime, instance configuration, type, the number of instances, load balancing, if detailed monitoring is included, if auto scaling is used, network addresses used, operating systems used, software packages usages, etc. An object data storage service might bill an account based on storage class, storage quantity used, the number and type of requests, the amount of data transferred out of the service, etc. A content delivery network service might bill an account based on traffic distribution (e.g., data transfer and request pricing, possibly varying across region, and based on the edge location from which content is served), the number and type of requests and the region in which they are made, the quantity of data transferred out of CDN edge locations, etc. An on-demand code execution service might bill an account based on the amount of memory allocated to execute code. A key-value database service might bill an account based on the provisioned write throughput, the provisioned read throughput, indexed data storage, data transfer, replication, reserved capacity, etc. All of these usages can be monitored and tracked by metering system 112 on a per-account basis and recorded in billing database 124.

ETL system 114 can be configured to extract, transform, and load operational data from request log 120, deploy log 112, billing database 124, source code repository, and account data 128 into sets of triples stored in triple-compliant knowledge base 130.

Triple-compliant query engine 116 can be configured to provide a semantic query language interface to knowledge base 130. One example of a semantic query language interface is SPARQL. SPARQL is an RDF query language for retrieving and manipulating data stored in RDF format. Triple-complaint inference engine 118 can be configured to perform machine learning-based inference based on trips in knowledge base. In some examples, inference engine 118 can be configured to identify alike services in provider network 100.

FIG. 2 illustrates a method for an ontology-based approach for modeling service dependencies in provider network 100. Steps of the method are depicted with numbered circles. At Step 1, service-oriented architecture (SOA) ontology 132 is defined. Ontology 132 can model the service-oriented architecture (SOA) of provider network 100. Ontology 132 can be defined using a Web Ontology Language such as a version of OWL Lite, OWL DL, or OWL Full. FIG. 1 illustrates an excerpt of an example SOA ontology, expressed in a UML format.

At Step 2, operational systems in provider network 100 including monitoring system 108, code deployment system 110, and metering system 112 collect data from regions, fleets, and hosts in provider network 100 as services are run and operate in provider network 100. The collection can occur over time for many users and as services are removed from provider network 100, services are added to provider network 100, and services are deployed or upgrade in provider network 100. The collected operational data can include request log data 120, deploy log data 112, billing data 124, source code repository data 126, and account data 128.

At Step 3, ETL system 114 extracts, transforms, and loads operations data 120, 122, 124, 126, or 128 into sets of triples (e.g., RDF triples) that are stored in knowledge base 130. The stored triples use the terminological concepts and the created assertion components of ontology 132. For example, following the terminological concepts and the created assertion components of the ontology excerpt of FIG. 1, if billing data 124 and account data 128 indicates that account 123 was billed for service XYZ, then a triple in knowledge base 130 may be created where the subject represents Account 123, the predicate represents "BILLED USAGE OF," and the object represents Service XYZ.

As another example, if request log data 120 indicates that service XYZ deployed on host fleet HF-1 in region US EAST (OHIO) makes HTTPS requests of service ABC deployed in host fleet HF-2 in region US EAST (OHIO), then following set of triples may be created:

| Subject | Predicate | Object |
| --- | --- | --- |
| Service XYZ | Deployed On | Host Fleet HF-1 |
| Service ABC | Deployed On | Host Fleet HF-2 |
| Host Fleet HF-1 | Deployed In | Region US EAST (OHIO) |
| Host Fleet HF-2 | Deployed In | Region US EAST (OHIO) |
| Service XYZ | Uses | Protocol HTTPS |
| Service ABC | Uses | Protocol HTTPS |

As another example, if deploy log 122 and source code repository 126 indicates that pipeline ABC that consumes source code set DEF has pipeline stage XYZ and pipeline stage XYZ deploys to account 123, then the following set of triples may be created:

| Subject | Predicate | Object |
| --- | --- | --- |
| Pipeline ABC | Consumes | Source Code Set DEF |
| Pipeline ABC | Has | Pipeline Stage XYZ |
| Pipeline Stage XYZ | Deploys To | Account 123 |

At Step 4, triple-compliant query engine 116 is used to answer various inquires about the modeled services in provider network 100. FIG. 3 is a table of some possible inquires about a SOA system modeled according to the ontology excerpt of FIG. 1. The inquires can be answered by SPARQL queries submitted to engine 116 and processed by engine 116 against the triples stored in knowledge base 130. For example, a SPARQL query may be submitted from a user device 150 to engine 116 of provider network 100 via intermediate networks 140. The first column of the table lists some possible inquires that can be answered by SPARQL queries. The second and third columns list the respective ontology classes and relationships of the ontology excerpt of FIG. 1 involved in answering the queries. For example, for inquiry Q1, a SPARQL query might identify all triples in knowledge base 130 where the ontology class of the subject is HOST FLEET, where the predicate is DEPLOYED IN, and the object is REGION <X> where <X> is a given region such as, for example, US WEST (N. CALIFORNIA). The subjects of these set of triples identifies all host fleets deployed in the given region. The set of host fleets can be joined with triples in knowledge base where the ontology class of the subject is SERVICE, the predicate is DEPLOYED ON, and the subject is a HOST FLEET in in the set of HOST FLEETs <Y> where Y is the set of host fleets in the given region.

Also at Step 4, knowledge base 130 can be explored by triple-compliant inference engine 118 to determine services in provider network 100 that are alike or for other inference inquires. In some examples, an ensemble model approach is used by inference engine 118 to compare RDF sub-graphs extracted from knowledge base 130 by query engine 116. An RDF sub-graph, for example, may be one that is obtained as an answer to an inquiry listed in FIG. 3. The ensemble approach can compare sub-graphs for syntactic, semantic, and structural similarity. For example, measuring syntactic similarity of the sub-graphs can be based on edit distance, fuzzy string matching, or trigram cosine similarity of node and edge labels in the sub-graphs. Measuring semantic similarity of the sub-graphs can be based on the meaning of node and edge labels in the sub-graphs as represented by word embeddings such as predefined word embeddings from a word embedding database such as WORDNET or the like. Measuring structural similarity of the sub-graphs can be based on the structure of the sub-graphs taking into account the internal and external edges between nodes.

Example Use Case

As an example, and using identifiers from a previously discussed example, consider a user's source code set DEF for which the user has configured a pipeline ABC with pipeline stage XYZ for deploying a particular service based on the source code set DEF to the user's account 123 contained by a host fleet HF-1 in region US EAST (OHIO). The user may wish to use source code set DEF, pipeline ABC, and pipeline stage XYZ to deploy the particular service in a different region of the provision network (e.g., US WEST (N. CALIFORNIA)). Before doing so, however, the user or the service provider may wish to understand which services the particular service depends on in the existing region US EAST (OHIO). The user or the service provider may desire this understanding to ensure that the dependent services are available in the target region US WEST (N. CALIFORNIA).

Figure 4:
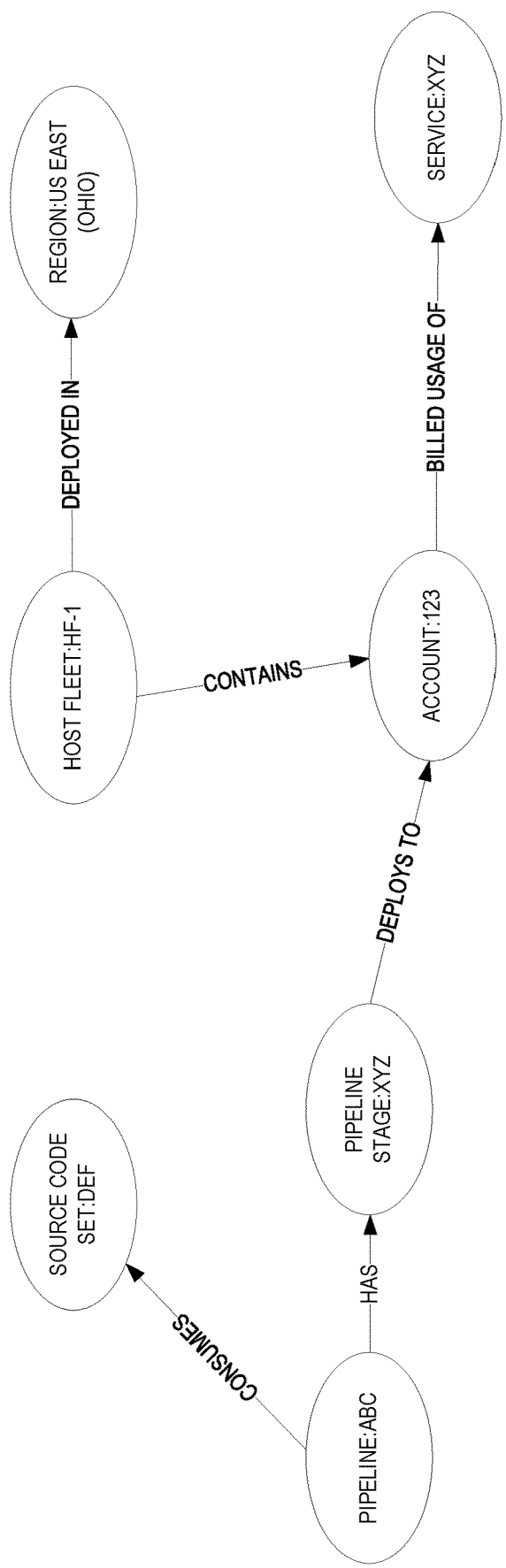
FIG. 4 illustrates an example triple sub-graph representing a result of a semantic query language query, according to some examples.

FIG. 4 illustrates an example RDF sub-graph representing an output of query engine 116 yielded in response to a SPARQL query with the query goal of identifying services that the user's particular service depends on starting with the given pipeline ABC. Here, through the BILLED USAGE OF relationship between Account and Service, it can be inferred that the particular service that is deployed by pipeline ABC is dependent on service XYZ.

Example Method

Figure 5:
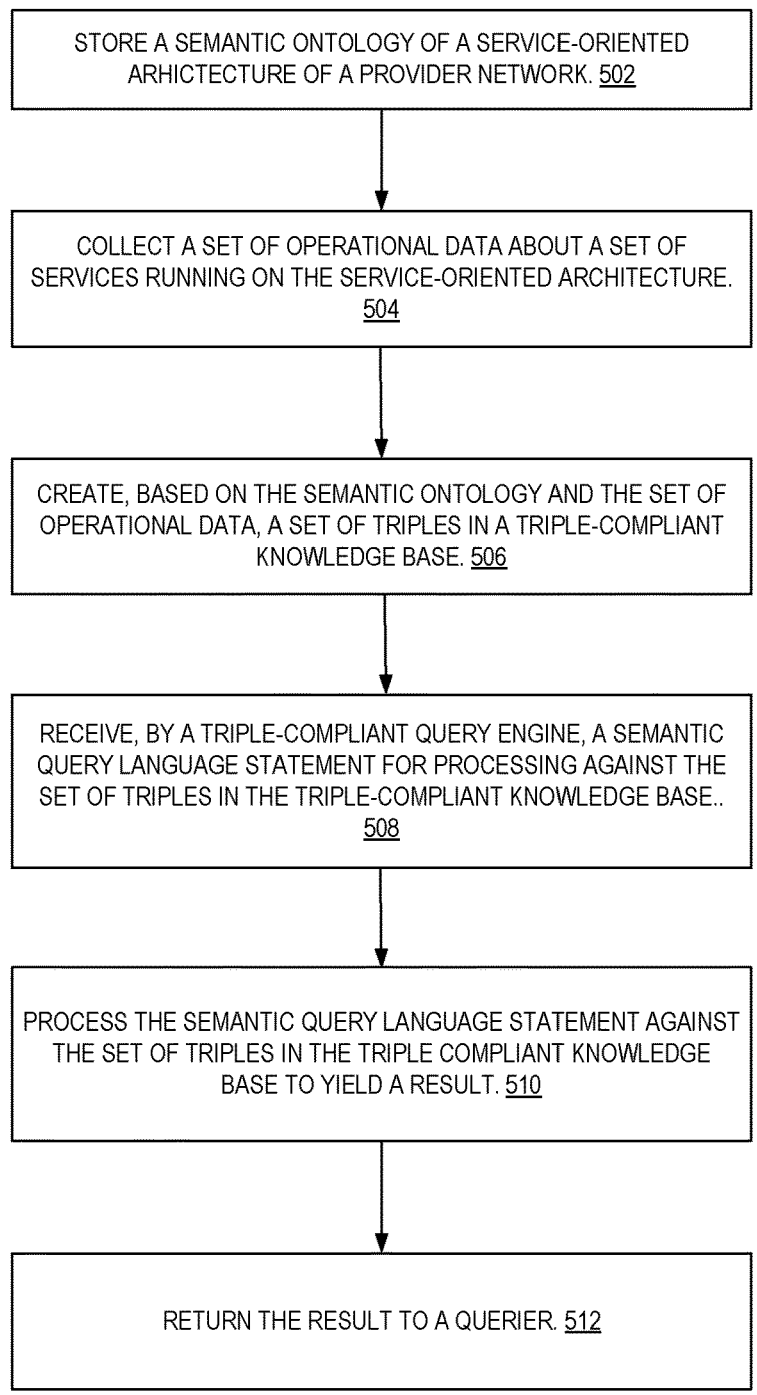
FIG. 5 is a flowchart that illustrates a method for an ontology-based approach for modeling service dependencies in a provider network, according to some examples.

FIG. 5 is a flowchart of operations of a method for an ontology-based approach for modeling service dependencies in a provider network, according to some examples. The method proceeds at operation 502 where a semantic ontology a service-oriented architecture (SOA) of a provider network is stored. An excerpt of an example ontology is discussed above with respect to FIG. 1. An example provider network is discussed above with respect to FIG. 2. In some examples, the SOA of the provider network includes regions, host fleets within each region, and hosts with each host fleet. In some examples, the semantic ontology is defined by a version of the OWL Web Ontology Language.

At operation 504, a set of operational data about a set of services running on the service-oriented architecture of the provider network is collected. In some examples, the set of operational data comprises request log data, code deployment log data, and metered service billing data.

At operation 506, a set of triples is created in a triple-compliant knowledge base based on the semantic ontology and the set of operational data. In some examples, the set of triples are a set of Resource Description Framework (RDF) triples.

At operation 508, a semantic query language statement is received by a triple-compliant query engine for processing against the set of triples created in the triple-compliant knowledge base. In some examples, the semantic query language statement is a SPARQL statement.

At operation 510, the semantic query language statement is processed by the triple-compliant query engine against the set of triples in the triple-compliant knowledge base to yield a result. In some examples, the result indicates that a particular subset of the set of services is deployed in a particular region of the provider network. In some examples, the result indicates a particular subset of one or more services of the set of services that incur billing usage by a particular account held with the provider network. In some examples, the result indicates a particular account to which a particular code deployment pipeline deploys to. In some examples, the result indicates a set of features implemented by a particular service of the set of services. In some examples, the result indicates a set of one or more services of the set of services that a particular service of the set of services depends on. In some examples, the result indicates a set of one or more services of the set of services that a particular service of the set of services interacts with. In some examples, the result indicates two services of the set of services that are alike in terms of at least features implemented by the two services and protocols used by the two services.

At operation 512, the result is returned to a querier. For example, the result can be returned to a personal computing device of a user where the result may be acted upon by a computing process there such as, for example, displaying a representation of the result in a graphical user interface.

Example Provider Network

Figure 6:
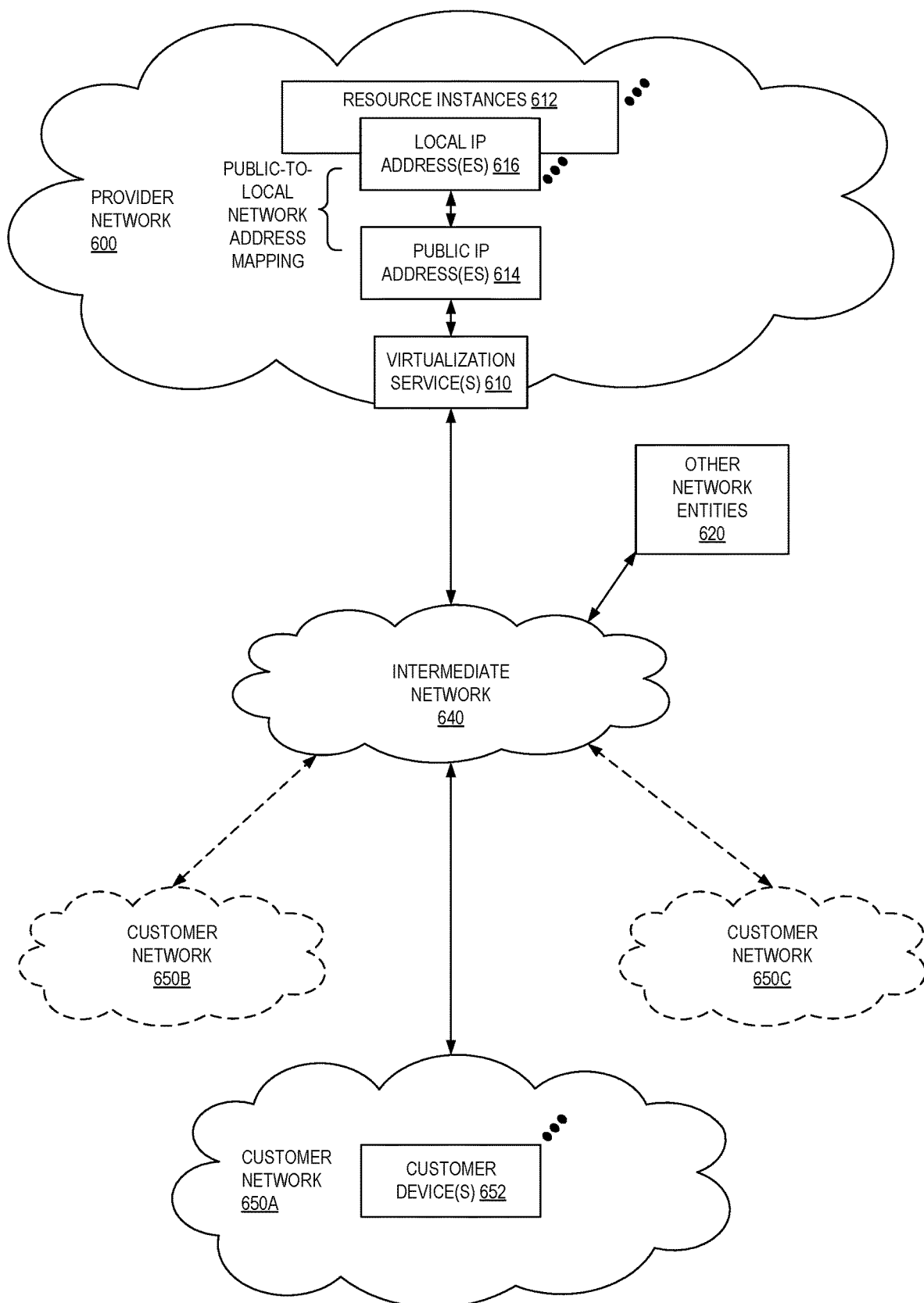
FIG. 6 illustrates an example provider network environment according to some embodiments.

FIG. 6 illustrates an example provider network (or "service provider system") environment according to some embodiments. A provider network 600 can provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 can be associated with the resource instances 612; the local IP addresses are the internal network addresses of the resource instances 612 on the provider network 600. In some embodiments, the provider network 600 can also provide public IP addresses 614 and/or public IP address ranges (e.g., Internet Protocol version 4 (IPv4) or Internet Protocol version 6 (IPv6) addresses) that customers can obtain from the provider 600.

Conventionally, the provider network 600, via the virtualization services 610, can allow a customer of the service provider (e.g., a customer that operates one or more customer networks 650A-650C (or "client networks") including one or more customer device(s) 652) to dynamically associate at least some public IP addresses 614 assigned or allocated to the customer with particular resource instances 612 assigned to the customer. The provider network 600 can also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of the customer network(s) 650A-650C can, for example, implement customer-specific applications and present the customer's applications on an intermediate network 640, such as the Internet. Other network entities 620 on the intermediate network 640 can then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 can be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some embodiments, the mapping of a standard IP address to a local IP address of a resource instance is the default launch configuration for all resource instance types.

At least some public IP addresses can be allocated to or obtained by customers of the provider network 600; a customer can then assign their allocated public IP addresses to particular resource instances allocated to the customer. These public IP addresses can be referred to as customer public IP addresses, or simply customer IP addresses. Instead of being assigned by the provider network 600 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
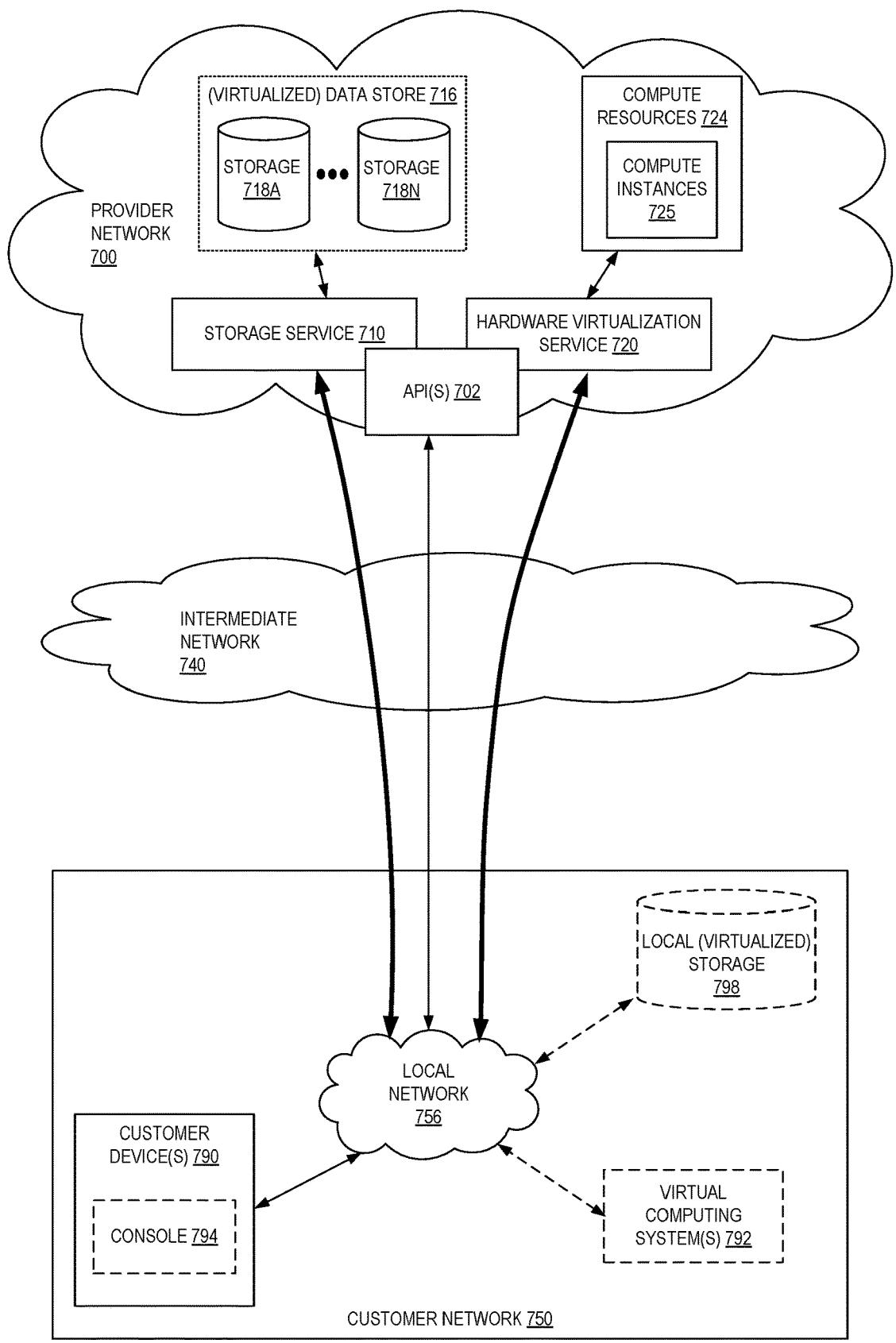
FIG. 7 is a block diagram of an example provider network that provides a storage service and a hardware virtualization service to customers according to some examples.

FIG. 7 is a block diagram of an example provider network environment that provides a storage service and a hardware virtualization service to customers, according to some embodiments. A hardware virtualization service 720 provides multiple compute resources 724 (e.g., compute instances 725, such as VMs) to customers. The compute resources 724 can, for example, be provided as a service to customers of a provider network 700 (e.g., to a customer that implements a customer network 750). Each computation resource 724 can be provided with one or more local IP addresses. The provider network 700 can be configured to route packets from the local IP addresses of the compute resources 724 to public Internet destinations, and from public Internet sources to the local IP addresses of the compute resources 724.

The provider network 700 can provide the customer network 750, for example coupled to an intermediate network 740 via a local network 756, the ability to implement virtual computing systems 792 via the hardware virtualization service 720 coupled to the intermediate network 740 and to the provider network 700. In some embodiments, the hardware virtualization service 720 can provide one or more APIs 702, for example a web services interface, via which the customer network 750 can access functionality provided by the hardware virtualization service 720, for example via a console 794 (e.g., a web-based application, standalone application, mobile application, etc.) of a customer device 790. In some embodiments, at the provider network 700, each virtual computing system 792 at the customer network 750 can correspond to a computation resource 724 that is leased, rented, or otherwise provided to the customer network 750.

From an instance of the virtual computing system(s) 792 and/or another customer device 790 (e.g., via console 794), the customer can access the functionality of a storage service 710, for example via the one or more APIs 702, to access data from and store data to storage resources 718A-718N of a virtual data store 716 (e.g., a folder or "bucket," a virtualized volume, a database, etc.) provided by the provider network 700. In some embodiments, a virtualized data store gateway (not shown) can be provided at the customer network 750 that can locally cache at least some data, for example frequently accessed or critical data, and that can communicate with the storage service 710 via one or more communications channels to upload new or modified data from a local cache so that the primary store of data (the virtualized data store 716) is maintained. In some embodiments, a user, via the virtual computing system 792 and/or another customer device 790, can mount and access virtual data store 716 volumes via the storage service 710 acting as a storage virtualization service, and these volumes can appear to the user as local (virtualized) storage 798.

While not shown in FIG. 7, the virtualization service(s) can also be accessed from resource instances within the provider network 700 via the API(s) 702. For example, a customer, appliance service provider, or other entity can access a virtualization service from within a respective virtual network on the provider network 700 via the API(s) 702 to request allocation of one or more resource instances within the virtual network or within another virtual network.

Example Computer System

Figure 8:
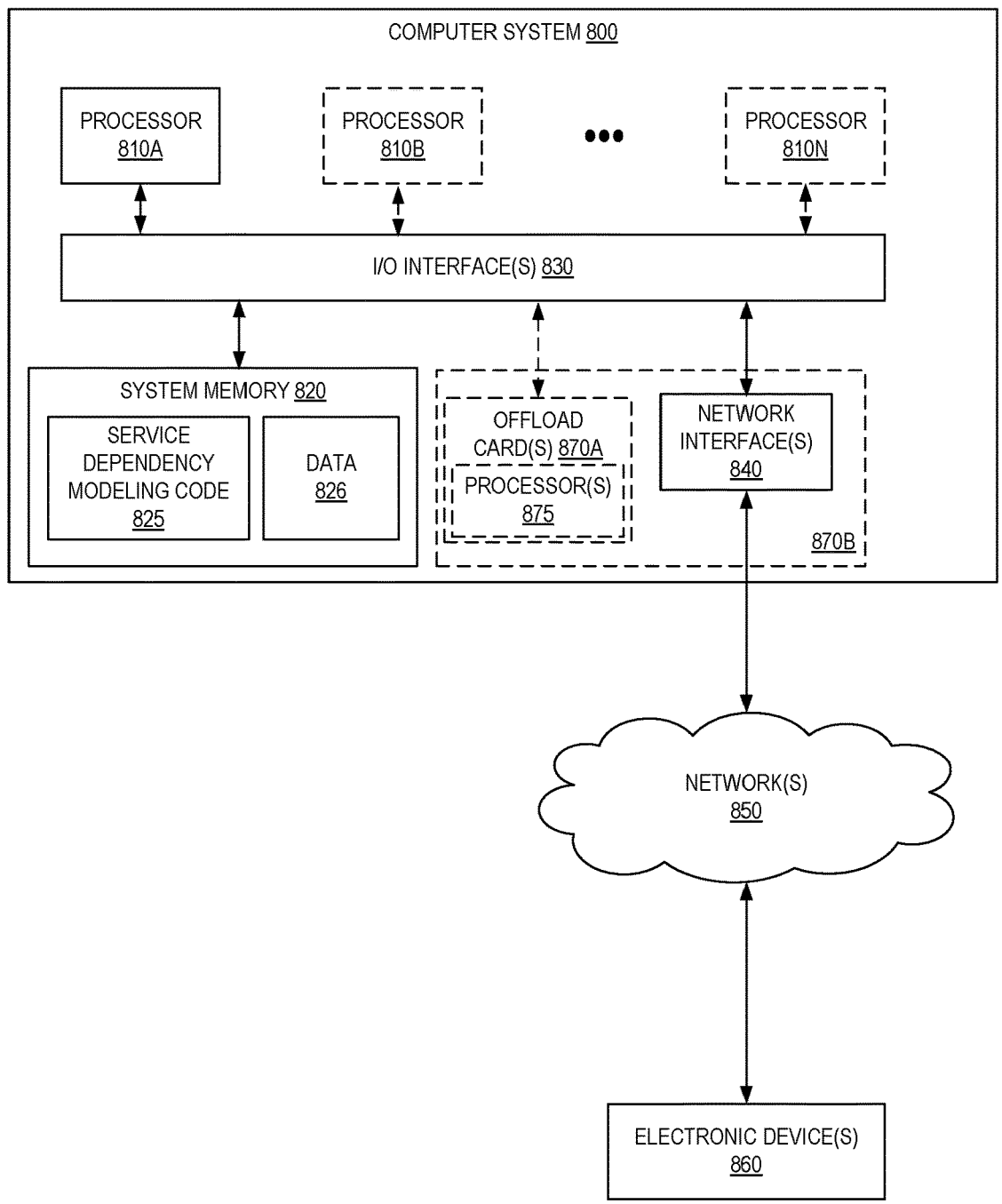
FIG. 8 is a block diagram illustrating an example computer system that can be used in some embodiments.

FIG. 8 illustrates computer system 800 that can be used in an implementation of techniques disclosed herein for ontology-based service dependency modeling in a provider network, according to some examples. Computer system 800 can include one or more processors 810 coupled to system memory 820 via input/output (I/O) interface 830. System 800 can further include network interface 840 coupled to I/O interface 830.

While FIG. 8 shows computer system 800 as a single computing device, in some examples computer system 800 can include one computing device or any number of computing devices configured to work together as an overall computer system 800 as in a distributed, parallel, clustered, or other coupled computing system arrangement.

Computer system 800 can be a uniprocessor system including one processor 810, or can be a multiprocessor system including several processors 810 (e.g., two, four, eight, or another suitable number). Processor(s) 810 can be any suitable processor(s) capable of executing instructions. For example, in various embodiments, processor(s) 810 can be general-purpose or embedded processors implementing any of a variety of instruction set architectures (ISAs), such as the X86, ARM, POWERPC, SPARC, or MIPS ISAs, or any other suitable ISA. In multiprocessor systems, each of processors 810 can commonly, but not necessarily, implement the same ISA.

System memory 820 can store instructions and data accessible by the processor(s) 810. In various embodiments, system memory 820 can be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 820 as service dependency modeling code 825 (e.g., executable to implement, in whole or in part, techniques disclosed herein for ontology-based modeling of service dependencies in a provider network) and data 826.

I/O interface 830 can be configured to coordinate I/O traffic between processor(s) 810, system memory 820, and any peripheral devices in the device, including network interface 840 or other peripheral interfaces (not shown). I/O interface 830 can perform any necessary protocol, timing, or other data transformations to convert data signals from one component (e.g., system memory 820) into a format suitable for use by another component (e.g., processor(s) 810). I/O interface 830 can include support for devices attached through various types of peripheral buses, such as a variant of the PERIPHERAL COMPONENT INTERCONNECT (PCI) bus standard or the UNIVERSAL SERIAL BUS (USB) standard, for example. The function of I/O interface 830 can be split into two or more separate components, such as a north bridge and a south bridge, for example. Also, some or all of the functionality of I/O interface 830, such as an interface to system memory 820, can be incorporated directly into processor 810.

Network interface 840 can be configured to allow data to be exchanged between computer system 800 and other devices 860 attached to network(s) 850, such as other computer systems or devices as illustrated in FIG. 1, for example. Network interface 840 can support communication via any suitable wired or wireless general data networks, such as types of Ethernet network, for example. Additionally, network interface 840 can support communication via telecommunications/telephony networks, such as analog voice networks or digital fiber communications networks, via storage area networks (SANs), such as Fibre Channel SANs, and/or via any other suitable type of network and/or protocol.

Computer system 800 can include one or more offload cards 870A or 870B (including one or more processors 875, and possibly including one or more network interfaces 840) that are connected using I/O interface 830 (e.g., a bus implementing a version of the PERIPHERAL COMPONENT INTERCONNECT-EXPRESS (PCI-E) standard, or another interconnect such as a QUICKPATH INTERCONNECT (QPI) or ULTRAPATH INTERCONNECT (UPI)). For example, computer system 800 can act as a host electronic device (e.g., operating as part of a hardware virtualization service) that hosts compute resources such as compute instances, and one or more offload cards 870A or 870B can execute a virtualization manager that can manage compute instances that execute on the host electronic device. As an example, offload card(s) 870A or 870B can perform compute instance management operations, such as pausing or un-pausing compute instances, launching or terminating compute instances, performing memory transfer/copying operations, etc. These management operations can be performed by offload card(s) 870A or 870B in coordination with a hypervisor (e.g., upon a request from a hypervisor) that is executed by other processors 810A-810N of computer system 800. However, the virtualization manager implemented by offload card(s) 870A or 870B can accommodate requests from other entities (e.g., from compute instances themselves).

System memory 820 can be a computer-accessible medium configured to store program instructions and data. However, program instructions or data can be received, sent, or stored upon different types of computer-accessible media. Computer-accessible media includes non-transitory computer-accessible media and computer-accessible transmission media. Examples of non-transitory computer-accessible media includes volatile or non-volatile computer-accessible media. Volatile computer-accessible media includes, for example, most general-purpose random-access memory (RAM) including dynamic RAM (DRAM) and static RAM (SRAM). Non-volatile computer-accessible media includes, for example, semiconductor memory chips capable of storing instructions or data in floating-gate memory cells composed of floating-gate metal-oxide-semiconductor field effect transistors (MOSFETs), including FLASH memory such as NAND flash and solid-state drives (SSD). Other examples of non-volatile computer-accessible media include read-only memory (ROM), erasable programmable ROM (EPROM), electrically erasable programmable ROM (EEPROM), ferroelectric RAM, and other computer data storage devices (e.g., disk storage, hard disks drives, optical discs, floppy disks, and magnetic tape).

EXTENSIONS AND ALTERNATIVES

In the foregoing detailed description, reference is made to examples, examples of which are illustrated in the accompanying drawings. Numerous specific details are set forth to provide a thorough understanding of the examples. However, it will be apparent to those skilled in the art that some examples can be practiced without these specific details. In other instances, well-known elements, features, acts, or operations have not been described in detail so as not to unnecessarily obscure the examples.

Unless the context clearly indicates otherwise, the term "or" is used in the foregoing description and in the appended claims in its inclusive sense (and not in its exclusive sense) so that when used, for example, to connect a list of elements, features, acts, or operations, the term "or" means one, some, or all the elements, features, acts, or operations in the list.

Unless the context clearly indicates otherwise, the terms "comprising," "including," "having," "based on," "encompassing," and other like terms, are used in the foregoing description and in the appended claims in an open-ended fashion, and do not exclude additional elements, features, acts, or operations.

Unless the context clearly indicates otherwise, conjunctive language in the foregoing description and in the appending claims such as the phrase "at least one of X, Y, and Z," is to be understood to convey that an item, term, etc. can be either X, Y, or Z, or a combination thereof. Thus, such conjunctive language is not intended to require by default implication that at least one of X, at least one of Y, and at least one of Z to each be present.

Unless the context clearly indicates otherwise, as used in the foregoing description and in the appended claims, the singular forms "a," "an," and "the" are intended to include the plural forms as well.

Unless the context clearly indicates otherwise, in the foregoing detailed description and in the appended claims, although the terms first, second, etc. are, in some instances, used herein to describe various elements, features, acts, or operations, these features, acts, or operations should not be limited by these terms. These terms are only used to distinguish one element, feature, act, or operation from another. For example, a first computing device could be termed a second computing device, and, similarly, a second computing device could be termed a first computing device. The first computing device and the second computing device are both computing devices, but they are not the same computing device.

What is claimed is:

1. A method comprising:
   storing, according to a semantic web language, a sematic ontology of a service-oriented architecture of a provider network, the service-oriented architecture comprising a plurality of regions, a plurality of host fleets within each region of the plurality of regions, and a plurality of hosts within each host fleet of the plurality of host fleets within each region of the plurality of regions;
   collecting a set of operational data about a set of services running on the service-oriented architecture in the provider network;
   based on the semantic ontology and the set of operational data, creating a set of subject-predicate-object triples in a triple-compliant knowledge base;
   wherein the set of triples represents at least that:
      a particular code deployment pipeline of a code deployment system of the provider network is associated with a particular code deployment pipeline stage of the particular code deployment pipeline,
      the particular code deployment pipeline stage is associated with a first particular service,
      the particular code deployment pipeline stage is associated with a particular user account held with the provider network,
      a particular host fleet of the plurality of host fleets is associated with the particular user account,
      the particular host fleet is associated with a particular region of the plurality of regions, and
      the particular user account is associated with a second particular service provided by the provider network;

receiving, by a triple-compliant query engine, a semantic query language statement for processing against the set of subject-predicate-object triples in the triple-compliant knowledge base; wherein the semantic query language statement identifies at least the particular code deployment pipeline;

processing the semantic query language statement against the set of subject-predicate-object triples in the triple-compliant knowledge base to yield a result; and returning the result to a computing device of a user; wherein the result returned to the querier indicates that the first particular service is dependent on the second particular service.

2. The method of claim 1, wherein the set of operational data comprises request log data, code deployment log data, and metered service billing data; wherein the set of triples are created based on the request log data, the code deployment log data, and the metered service billing data.

3. A method comprising:

storing a sematic ontology of a service-oriented architecture of a provider network, the service-oriented architecture comprising a plurality of regions, a plurality of host fleets within each region of the plurality of regions, and a plurality of hosts within each host fleet of the plurality of host fleets within each region of the plurality of regions;

collecting a set of operational data about a set of services running on the service-oriented architecture in the provider network; wherein the set of operational data comprises request log data, code deployment log data, and metered service billing data;

based on the semantic ontology and the set of operational data, creating a set of triples in a triple-compliant knowledge base; wherein the set of triples are created based on the request log data, the code deployment log data, and the metered service billing data;

receiving, by a triple-compliant query engine, a semantic query language statement for processing against the set of triples in the triple-compliant knowledge base;

processing the semantic query language statement against the set of triples in the triple-compliant knowledge base to yield a result; wherein the semantic query language statement identifies at least a particular code deployment pipeline; wherein the particular code deployment pipeline is associated with a first particular service deployed on a particular host fleet of the plurality of host fleets in a particular region of the plurality of regions; and returning the result to a querier; wherein the result indicates that the first particular service is dependent on a second particular service provided by the provider network.

4. The method of claim 3, wherein the result indicates that the second particular service is deployed in the particular region of the plurality of regions.

5. The method of claim 3, wherein the result indicates the second particular service incurs billing usage by a particular account.

6. The method of claim 3, wherein the result indicates a particular account to which the particular code deployment pipeline deploys to.

7. The method of claim 3, wherein the result indicates a set of features implemented by the second particular service of the set of services.

8. The method of claim 3, wherein the result indicates two services of the set of services that are alike in terms of at least features implemented by the two services and protocols used by the two services.

9. The method of claim 3, wherein the semantic ontology is defined according to a version of a semantic web language.

10. The method of claim 3, wherein the set of triples comprises a set of subject-predicate-object triples.

11. The method of claim 3, wherein the set of triples represents at least that:

the particular code deployment pipeline is associated with a particular code deployment pipeline stage of the particular code deployment pipeline, the particular code deployment pipeline stage is associated with the first particular service, the particular code deployment pipeline stage is associated with a particular user account held with the provider network, the particular host fleet of the plurality of host fleets is associated with the particular user account, the particular host fleet is associated with the particular region of the plurality of regions, and the particular user account is associated with the second particular service provided by the provider network.

12. A system comprising:

a set of one or more electronic devices to implement an ontology-based service dependency modeling service, the modeling service comprising instructions which when executed cause the modeling service to:

store a sematic ontology of a service-oriented architecture of a provider network, the server-oriented architecture comprising a plurality of regions, a plurality of host fleets within each region of the plurality of regions, and a plurality of hosts within each host fleet of the plurality of host fleets within each region of the plurality of regions;

collect a set of operational data about a set of services running on the service-oriented architecture in the provider network; wherein the set of operational data comprises request log data, code deployment log data, and metered service billing data;

create, based on the semantic ontology and the set of operational data, a set of triples in a triple-compliant knowledge base; wherein the set of triples are created based on the request log data, the code deployment log data, and the metered service billing data;

receive, by a triple-compliant query engine, a semantic query language statement for processing against the set of triples in the triple-compliant knowledge base;

process the semantic query language statement against the set of triples in the triple-compliant knowledge base to yield a result; wherein the semantic query language statement identifies at least a particular code deployment pipeline; wherein the particular code deployment pipeline is associated with a first particular service deployed on a particular host fleet of the plurality of host fleets in a particular region of the plurality of regions; and return the result to a querier; wherein the result indicates that the first particular service is dependent on a second particular service provided by the provider network.

13. The system of claim 12, wherein the result indicates that the second particular service is deployed in the particular region of the plurality of regions.

14. The system of claim 12, wherein the result indicates the second particular service incurs billing usage by a particular account.

15. The system of claim 12, wherein the result indicates a particular account to which the particular code deployment pipeline deploys to.

16. The system of claim 12, wherein the result indicates a set of features implemented by the second particular service of the set of services.

17. The system of claim 12, wherein the set of triples represents at least that:
- the particular code deployment pipeline is associated with a particular code deployment pipeline stage of the particular code deployment pipeline,
- the particular code deployment pipeline stage is associated with the first particular service,
- the particular code deployment pipeline stage is associated with a particular user account held with the provider network,
- the particular host fleet of the plurality of host fleets is associated with the particular user account,
- the particular host fleet is associated with the particular region of the plurality of regions, and
- the particular user account is associated with the second particular service provided by the provider network.

* * * * *